United States Patent
Katata et al.

(10) Patent No.: US 6,295,381 B1
(45) Date of Patent: Sep. 25, 2001

(54) CODING APPARATUS AND DECODING APPARATUS OF IMAGE DATA AND CORRESPONDING SHAPE DATA AT DIFFERENT RESOLUTIONS

(75) Inventors: Hiroyuki Katata; Hiroshi Kusao; Tomoko Aono; Norio Ito; Shuichi Watanabe, all of Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/202,678
(22) PCT Filed: May 7, 1997
(86) PCT No.: PCT/JP97/01540
§ 371 Date: Dec. 18, 1998
§ 102(e) Date: Dec. 18, 1998
(87) PCT Pub. No.: WO97/50253
PCT Pub. Date: Dec. 31, 1997

(30) Foreign Application Priority Data

Jun. 27, 1996 (JP) ..................................................... 8-166978

(51) Int. Cl.[7] ................................ G06K 9/36; G06K 9/46
(52) U.S. Cl. ........................ 382/240; 382/243; 375/240.1
(58) Field of Search ................................. 382/232, 233, 382/239, 240, 243, 294, 282; 348/397.1, 408.1, 437.1, 438.1; 345/441; 375/240.08, 240.1, 240.21, 240.25

(56) References Cited

U.S. PATENT DOCUMENTS

| | | | |
|---|---|---|---|
| 5,828,788 | * 10/1998 | Chiang et al. | 382/239 |
| 6,009,200 | * 12/1999 | Fujita et al. | 382/232 |
| 6,151,424 | * 11/2000 | Hsu | 382/294 |

FOREIGN PATENT DOCUMENTS

| | | | |
|---|---|---|---|
| 0 588 411 A1 | 3/1994 | (EP) | H04N/7/13 |
| 1-141479 | 6/1989 | (JP) | H04N/7/12 |
| 2-65371 | 3/1990 | (JP) | H04N/1/417 |
| 4-151988 | 5/1992 | (JP) | H04N/7/13 |
| 6-209468 | 7/1994 | (JP) | H04N/7/137 |
| 7-107488 | 4/1995 | (JP) | H04N/7/32 |
| 7-262384 | 10/1995 | (JP) | . |
| 7-288789 | 10/1995 | (JP) | H04N/7/14 |
| 8-88856 | 4/1996 | (JP) | H04N/7/32 |

OTHER PUBLICATIONS

"An Image Coding Scheme Using Layered Representation and Multiple Templates" (Technical Report of IEICE, IE94–159, pp. 99–106 (1995)).

Cliff Reader "MPEG4: coding for content, interactivity, and universal accessibility" Optical Engineering, vol. 35, No. 1 (Jan., 1996) p. 104–108.

Hiroyuki Kasai and three others "Study on video media coding architecture using look–at point information (in Japanese)", Research Report of Information Processing Soc. Of Japan 95–AVM–10, vol. 95, No. 90, Sep. 1995 (Tokyo) p. 31–37.

(List continued on next page.)

Primary Examiner—Timothy M. Johnson
(74) Attorney, Agent, or Firm—Nixon & Vanderhye PC

(57) ABSTRACT

An image coding apparatus inputs pixel data of a part image of high resolution. An upper layer coding portion (101), a second shape data generating portion (102), and a second shape data coding portion (103) perform coding of shape data and pixel data in the upper layer. A down sampling portion (104) generates pixel data of low resolution. A lower layer coding portion (105), a first shape data generating portion (106), and a first shape data coding portion (107) code shape data and pixel data in the lower layer.

4 Claims, 12 Drawing Sheets

OTHER PUBLICATIONS

Nabuya Suzuki and two others "Region–base low–bit–rate coding method (in Japanese)", Research Report of Information Processing Soc. Of Japan 95–AVM–9, vol. 95, No. 64, Jul. 1995 (Tokyo) p. 9–15.

Takeshi Hanamura and three others "Proposal for hierarchical moving–picture coding method for MPEGII (in Japanese)", Technical Research Report of IEICE IE91–113, vol. 91, No. 477, Feb. 1992 (Tokyo) p. 1–8.

Signal Processing Image Communication 1 (1989) Oct., No., 2, Amsterdam, NE, "Coding of Arbitrarily Shaped Image Segments Based on a Generalized Orthogonal Transform", Gilge et al., pp. 153–180.

Munich Meeting of MPEG–4 Working Group Report ISO/IEC, XP 002047798, 1996, pp. 3–49.

Supplementary European Search Report.

* cited by examiner

| 0 | 0 | 0 | 0 | 0 | 0 | 0 | 0 |
|---|---|---|---|---|---|---|---|
| 0 | 0 | 0 | 1 | 1 | 1 | 0 | 0 |
| 0 | 0 | 1 | 1 | 1 | 1 | 0 | 0 |
| 0 | 0 | 0 | 1 | 1 | 1 | 1 | 0 |
| 0 | 0 | 0 | 1 | 1 | 1 | 1 | 0 |
| 0 | 0 | 0 | 1 | 0 | 0 | 0 | 0 |

| 0.00 | 0.25 | 0.50 | 0.00 |
|------|------|------|------|
| 0.00 | 0.75 | 1.00 | 0.25 |
| 0.00 | 0.50 | 0.50 | 0.25 |

| 0.00 | 0.25 | 0.50 | 0.00 |
|------|------|------|------|
| 0.00 | 0.75 | 1.00 | 0.25 |
| 0.00 | 0.50 | 0.50 | 0.25 |

US 6,295,381 B1

CODING APPARATUS AND DECODING APPARATUS OF IMAGE DATA AND CORRESPONDING SHAPE DATA AT DIFFERENT RESOLUTIONS

TECHNICAL FIELD

The present invention relates to an image coding apparatus and an image decoding apparatus, and more particularly to a motion image coding apparatus for coding image data in an efficient manner and a motion image decoding apparatus for decoding the coded data generated by the motion image coding apparatus, used in the field of digital image processing.

BACKGROUND ART

In image coding, a method of superimposing different motion image sequences has been considered. An article titled "An Image Coding Scheme Using Layered Representation and Multiple Templates" (Technical Report of IEICE, IE94–159, pp. 99–106 (1995)) describes a scheme for superimposing a motion image sequence as a background and another motion image sequence of a component or part image (e.g., video image of a human figure or fish cut out by chromakey technique) as a foreground, to generate a new image sequence.

FIG. 12 is a block diagram showing a coding apparatus and a decoding apparatus according to the conventional art. A pixel data coding portion 1201 in FIG. 12 is a portion for coding pixel data representing intensity and color difference, and a shape data coding portion 1202 is for coding shape data representing a shape of part image. These portions constitute an apparatus for coding a part image.

Shape data are used for coding pixel data. A pixel data decoding portion 1203 in FIG. 12 is a portion for decoding pixel data, and a shape data decoding portion 1204 is for decoding shape data. These portions constitute an apparatus for decoding a part image. For decoding pixel data, decoded shape data are used.

Shape data coding portion 1202 first expresses a contour of a shape using 8 directional chain codes, for example, and then codes the chain codes by Huffman coding. Pixel data coding portion 1201 codes pixel data by the international standard method of coding motion images, such as MPEG or H.261. When pixel data are divided into blocks, an arbitrary shape DCT technique or the like is employed for the block including a boundary of part image.

Each part image is decoded by a decoding apparatus, and then superimposed at a superimposing portion (not shown) using shape data, and displayed on a device like a display. For example, when superimposing a part image p (i,j) in arbitrary shape on a rectangular background image b (i,j), a display image f (i,j) is generated using shape data s (i,j) according to the following expression (1):

$$f(i,j)=p(i,j)s(i,j)+b(i,j)[1-s(i,j)] \quad (1)$$

wherein (i,j) represents a coordinate of a pixel, and f(i,j) represents a pixel value. s(i,j) assumes the value "1" within a part image, and "0" outside the part image.

In the conventional art, however, there has not been proposed a technique for setting up spatial hierarchy for a part image. The international standard MPEG2 method realizes hierarchy (i.e., spatial hierarchy) over an entire image. In the method, data in a lower layer having low spatial resolution throughout the entire image and data in an upper layer for improving the resolution are decoded together to achieve high spatial resolution.

Accordingly, an object of the present invention is to provide an image coding apparatus and an image decoding apparatus that can realize spatial hierarchy in a part image.

To obtain shape data of low resolution, high-resolution shape data obtained by the conventional art may simply be thinned out. However, if thus obtained low-resolution image is displayed on a large-screen monitor having low resolution, the contour of a part will have stepwise appearance, which leads to deterioration in psychic image quality. The same problem arises when a low-resolution image is enlarged for display on a large-screen monitor having high resolution.

Accordingly, another object of the present invention is to provide an image coding apparatus and an image decoding apparatus that can solve the above problem.

DISCLOSURE OF THE INVENTION

In the present invention, an image coding apparatus and an image decoding apparatus as described in the following (1) through (10) are provided to solve the above-described problems.

(1) An image coding apparatus performing lower layer coding for coding a part image in arbitrary shape in low resolution and upper layer coding for coding the part image in high resolution, comprising: a first shape data generating portion for generating low-resolution shape data representing the arbitrary shape; a first shape data coding portion for coding the generated low-resolution shape data; a second shape data generating portion for generating high-resolution shape data representing the arbitrary shape; and a second shape data coding portion for coding the generated high-resolution shape data; wherein the low-resolution shape data are used for coding the part image in the lower layer, and the high-resolution shape data and the decoded part image data in the lower layer are used for coding the part image in the upper layer.

(2) The image coding apparatus according to (1), wherein the second shape data coding portion codes information on difference between the high-resolution shape data and the low-resolution shape data.

(3) An image coding apparatus performing lower layer coding for coding a part image in arbitrary shape in low resolution and upper layer coding for coding the part image in high resolution, wherein high resolution shape data of the part image are shared by the upper and lower layers; the apparatus comprising a high-resolution shape data generating portion for generating high-resolution shape data of the part image, and a shape data coding portion for coding the generated high-resolution shape data; wherein high resolution shape data having N levels of gradation (N is at least 2) are transformed to low-resolution shape data having M levels of gradation (M>N), the low-resolution shape data are used for coding the part image in the lower layer, and the high-resolution shape data and the decoded part image data in the lower layer are used for coding the part image in the upper layer.

(4) An image decoding apparatus for decoding data coded by the image coding apparatus according to (1), performing lower layer decoding for decoding a part image in arbitrary shape in low resolution and upper layer decoding for decoding the part image in high resolution; the apparatus comprising: a first shape data decoding portion for decoding low-resolution shape data, and a second shape data decoding portion for decoding high-resolution shape data; the low-resolution shape data are used for decoding the part image in the lower layer, and the high-resolution shape data and the decoded part image data in the lower layer are used for decoding the part image in the upper layer.

(5) An image decoding apparatus for decoding data coded by the image coding apparatus according to (2), performing lower layer decoding for decoding a part image in arbitrary shape in low resolution and upper layer decoding for decoding the part image in high resolution; the apparatus comprising: a first shape data decoding portion for decoding low-resolution shape data, and a second shape data decoding portion for decoding high-resolution shape data; wherein the low-resolution shape data are used for decoding the part image in the lower layer, and the high-resolution shape data and the decoded part image data in the lower layer are used for decoding the part image in the upper layer; and the second shape data decoding portion uses information on difference between the high-resolution shape data and the low-resolution shape data to obtain high resolution shape data.

(6) An image decoding apparatus for decoding data coded by the image coding apparatus according to (3), performing lower layer decoding for decoding a part image in arbitrary shape in low resolution and upper layer decoding for decoding the part image in high resolution; wherein high resolution shape data of the part image are shared by the lower and upper layers; the apparatus comprising a shape data decoding portion for decoding high-resolution shape data; wherein high resolution shape data with N levels of gradation (N is at least 2) are transformed to low-resolution shape data with M levels of gradation (M>N), the transformed shape data are used for decoding the part image in the lower layer, and the high-resolution shape data and the decoded part image in the lower layer are used for decoding the part image in the upper layer.

(7) The image coding apparatus according to (1), wherein the second shape data generating portion has a mode for generating high-resolution shape data corresponding to a portion of the part image coded in the lower layer.

(8) The image coding apparatus according to (2), wherein the second shape data generating portion has a mode for generating high-resolution shape data corresponding to a portion of the part image coded in the lower layer, and when the mode is selected, the second shape data coding portion codes the high-resolution shape data independent of the low-resolution shape data.

(9) An image decoding apparatus for decoding data coded by the image coding apparatus according to (7), performing lower layer decoding for decoding a part image in arbitrary shape in low resolution and upper layer decoding for decoding the part image in high resolution; the apparatus comprising: a first shape data decoding portion for decoding low-resolution shape data, and a second shape data decoding portion for decoding high-resolution shape data; wherein the low-resolution shape data are used for decoding the part image in the lower layer, and the high-resolution shape data and the decoded part image data in the lower layer are used for decoding the part image in the upper layer; and the second shape data decoding portion has a mode for decoding high-resolution shape data corresponding to a portion of the part image coded in the lower layer.

(10) An image decoding apparatus for decoding data coded by the image coding apparatus according to (8), performing lower layer decoding for decoding a part image in arbitrary shape in low resolution and upper layer decoding for decoding the part image in high resolution; the apparatus comprising: a first shape data decoding portion for decoding low-resolution shape data, and a second shape data decoding portion for decoding high-resolution shape data; wherein the low-resolution shape data are used for decoding the part image in the lower layer, and the high-resolution shape data and the decoded part image data in the lower layer are used for decoding the part image in the upper layer; the second shape data decoding portion uses information on difference between the high-resolution shape data and the low-resolution shape data to obtain high-resolution shape data; and the second shape data decoding portion has a mode for decoding high-resolution shape data corresponding to a portion of the part image coded in the lower layer, and, when the mode is selected, decodes the high-resolution shape data independent of the low-resolution shape data.

BEST MODE FOR CARRYING OUT THE INVENTION

Hereinafter, embodiments of the present invention will be described, though the present invention is not limited to those embodiments.

Figure 10:
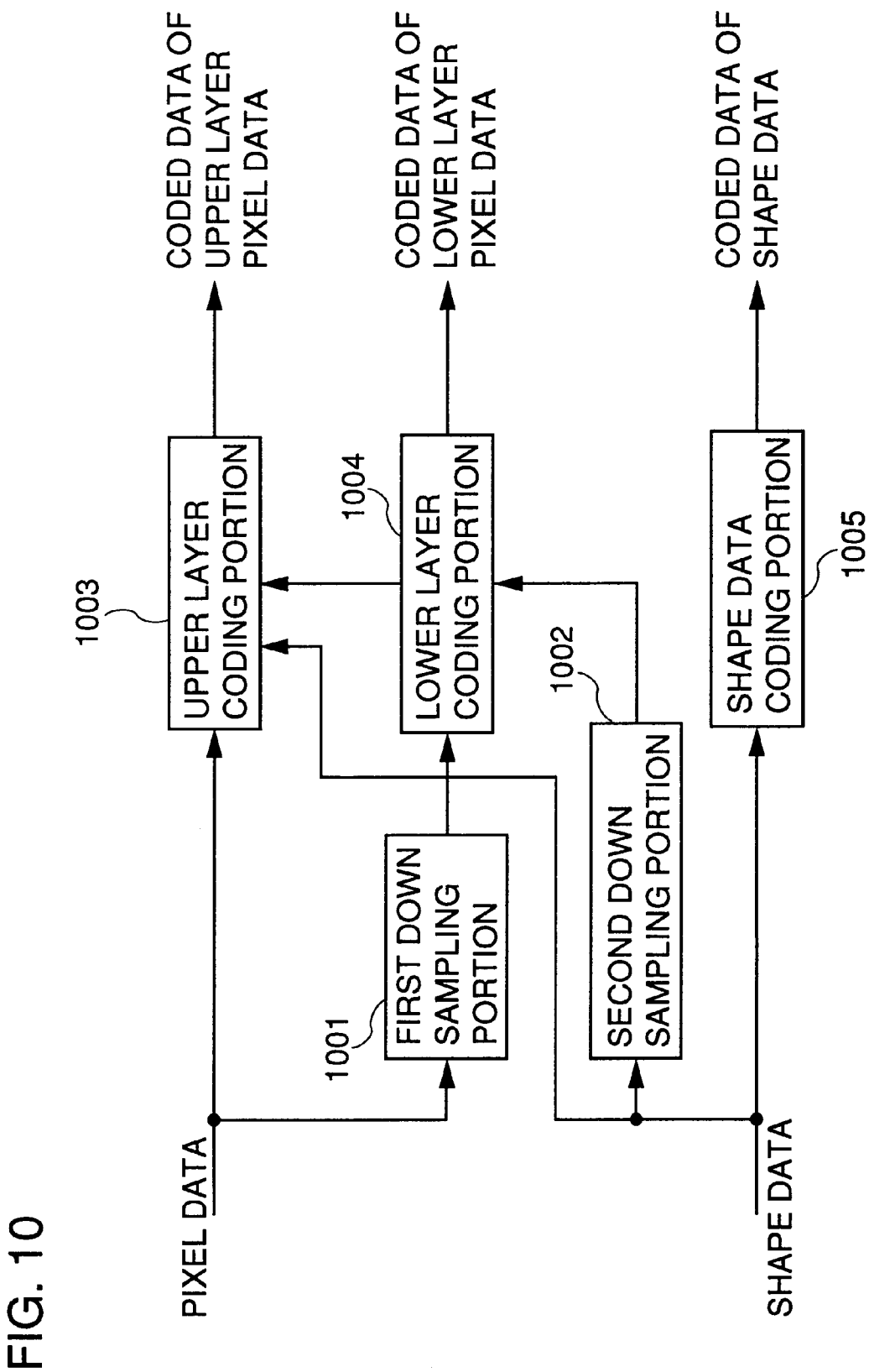
FIG. 10 is a block diagram showing an example of an apparatus for performing hierarchical coding of a part image according to the present invention.

An apparatus shown in FIG. 10 is considered as means for setting up spatial hierarchy in a part image. A down sampling portion 1001 in FIG. 10 thins out pixels from input pixel data to lower spatial resolution of the pixel data. A second down sampling portion 1002 thins out pixels from input shape data to lower spatial resolution of the shape data. The shape data show a shape of part image, and are represented as a binary image having a pixel value "1" within a part and a pixel value "0" outside the part, for example.

A lower layer coding portion 1004 codes pixel data of low resolution. For the coding, the international standard method of coding motion images, such as MPEG or H.261, is employed. When an image is divided into blocks, an arbitrary shape DCT technique or the like is used for a block including a boundary of part image. In this case, low-resolution shape data output from second down sampling portion 1002 are used as information on the boundary of the part image.

An upper layer coding portion 1003 codes pixel data of high resolution, in which the international standard method of motion image coding such as MPEG or H.261 is also employed. Here, prediction from the decoded images in the lower layer as well as in the upper layer is employed. For the boundary of the part image, high-resolution shape data that have not been down sampled are used.

A shape data coding portion 1005 codes shape data of high resolution that corresponds to the resolution of the upper layer. The contour of a shape is expressed with 8 directional chain codes, for example, and these chain codes are coded by Huffman coding.

Figure 11:
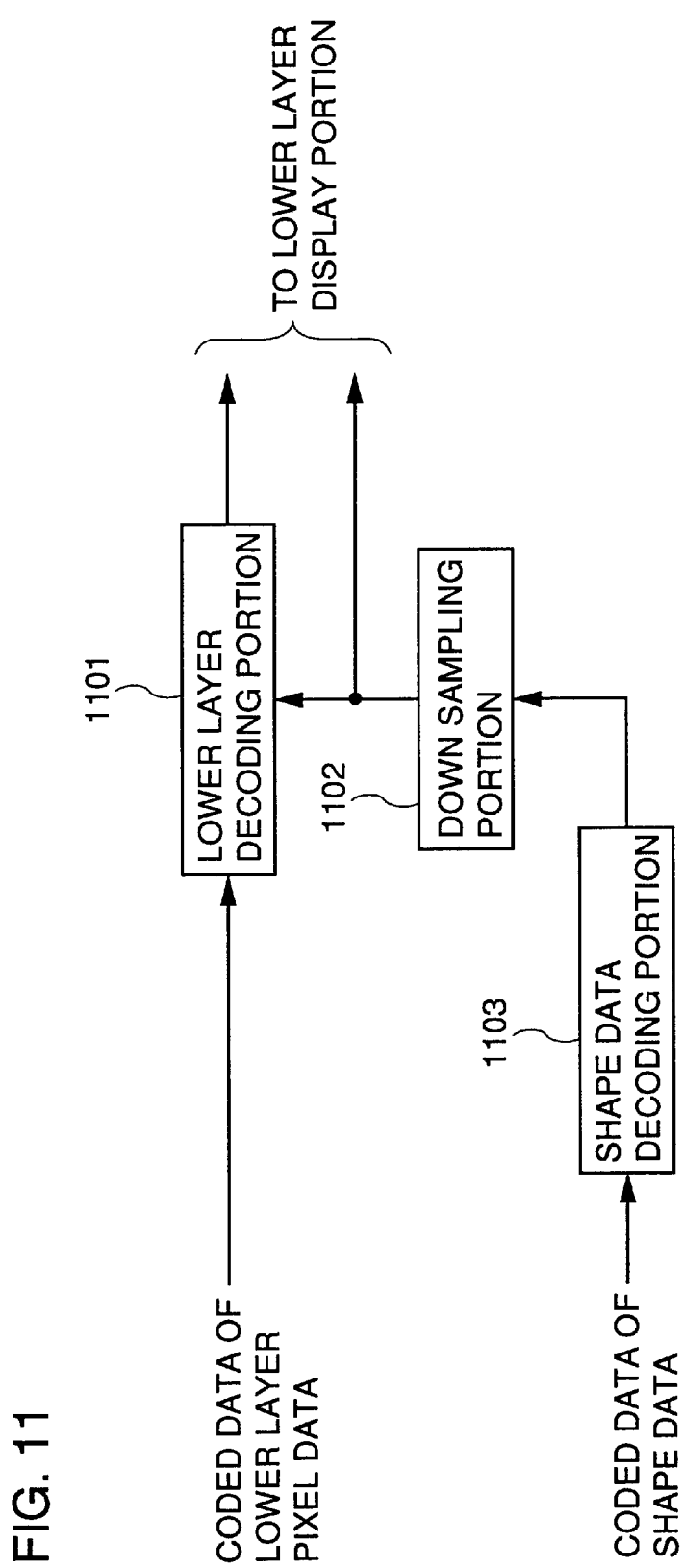
FIG. 11 is a block diagram showing a lower layer decoding apparatus according to the present invention.
Figure 12:
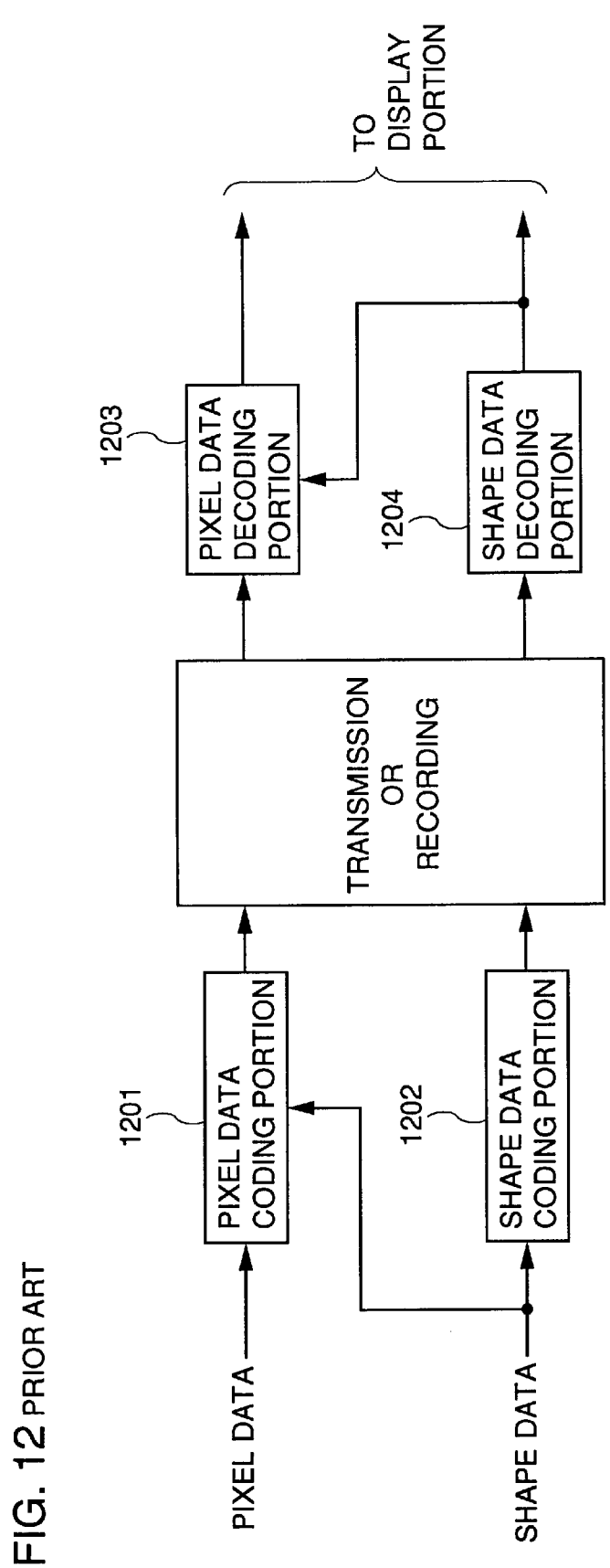
FIG. 12 is a block diagram showing a coding apparatus and a decoding apparatus in the conventional art.

The coded data are integrated by an integration portion (not shown), and transmitted or stored. In a decoding apparatus for decoding only a lower layer, as shown in FIG. 11, only the data necessary for decoding the lower layer are picked up from the coded data having those for the upper and lower layers integrated therein, and are used for the decoding process. In other words, "coded data of the lower layer pixel data" and "coded data of the shape data" are selected at a selection portion (not shown) and decoded.

At this time, a shape data decoding portion 1103 in FIG. 11 decodes high-resolution shape data. Low-resolution shape data are obtained in a down sampling portion 1102, using the same technique as in second down sampling portion 1002 of FIG. 10. Thus obtained data are used for decoding pixel data in a lower layer decoding portion 1101. A decoding apparatus for decoding up to an upper layer uses all the coded data to conduct decoding up to the upper layer.

However, the above-described apparatus suffers the following problem. That is, though conventional decoding of a lower layer only requires shape data of low resolution, the above apparatus has to use high-resolution shape data when coding data in the lower layer, which results in redundant data. In other words, shape data in an upper layer having a large amount of codes should be used instead of shape data in a lower layer with a less amount of codes. Therefore, it becomes difficult to code a lower layer in good image quality with a limited transmission or storage capacity.

The first and second embodiments of the present invention aim to solve this problem.

Figure 1:
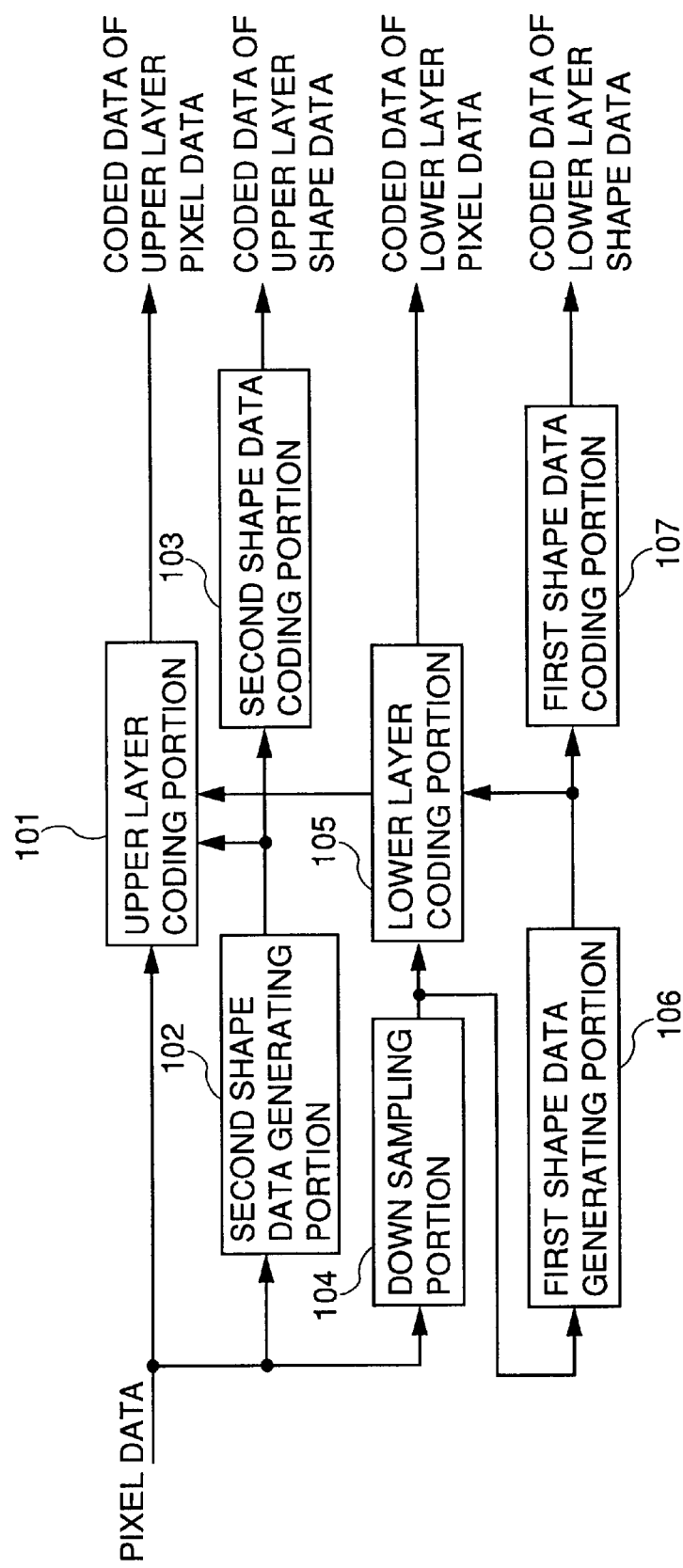
FIG. 1 is a block diagram showing a coding apparatus according to a first embodiment of the present invention.
Figure 2:
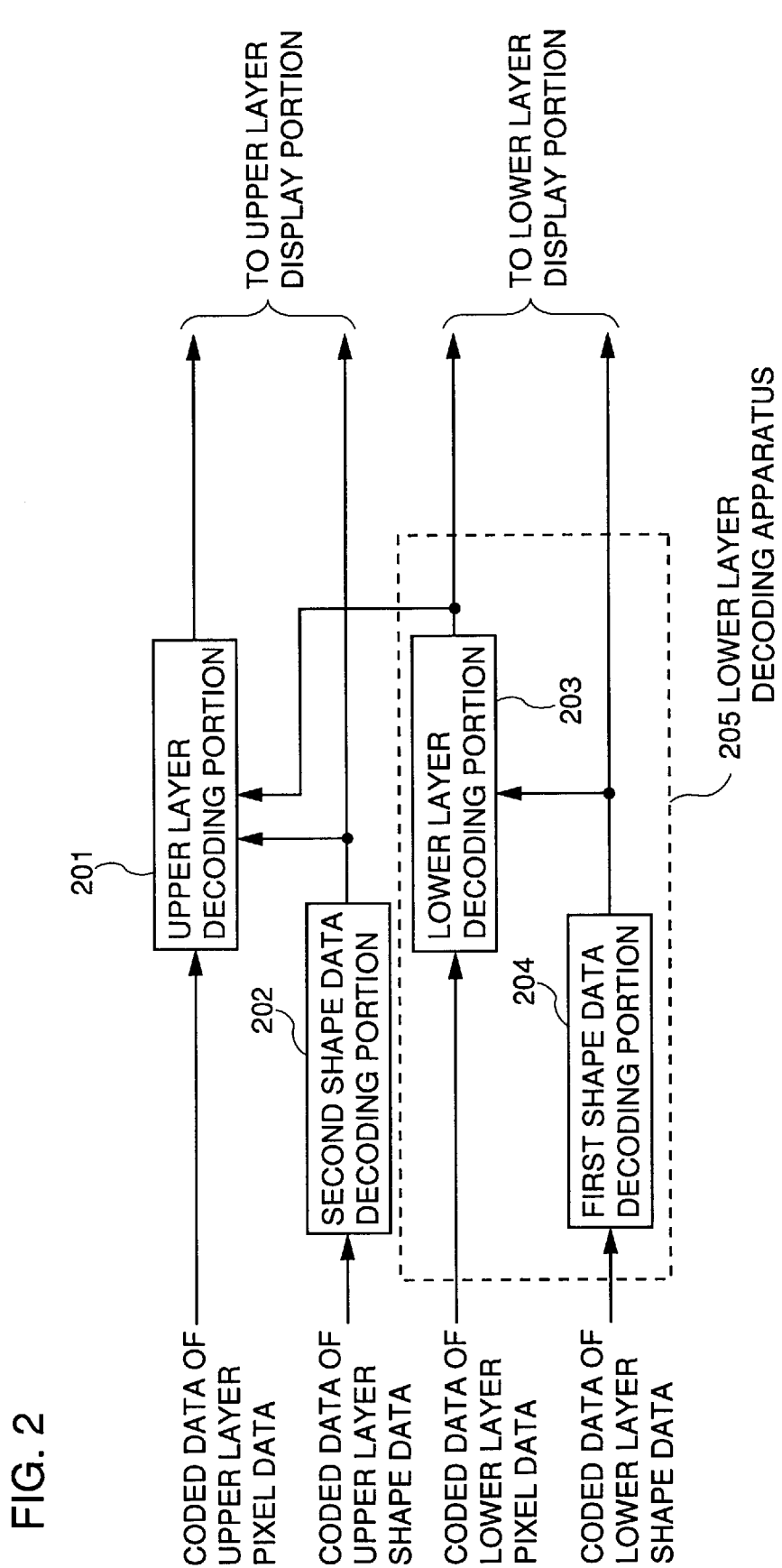
FIG. 2 is a block diagram showing a decoding apparatus according to the first embodiment of the present invention.

FIGS. 1 and 2 are block diagrams respectively showing a coding apparatus and a decoding apparatus according to the first embodiment.

Referring to FIG. 1, a down sampling portion 104 thins out input pixel data to generate low-resolution pixel data for a lower layer. When thinning out, a low pass filter is used to prevent aliasing. A lower layer coding portion 105 codes the low-resolution pixel data.

For coding, the internationally standardized method of coding motion images, such as MPEG or H.261, is employed. When an image is divided into blocks, an arbitrary shape DCT technique or the like is employed for a block including a boundary of part image. For the boundary of the part image, low-resolution shape data output from a first shape data generating portion 106 are used.

First shape data generating portion 106 generates low-resolution shape data for a lower layer. Shape data are extracted by dividing pixel data into areas, for example. Techniques used for the area dividing include an edge detecting technique using differential operation, and morphological segmentation.

When cutting out a shape of moving object from a static background, dynamic area detection using intra-frame differences can be utilized. Alternatively, shape data can be generated by chromakey technique. In FIG. 1, low-resolution shape data are obtained after thinning out target pixel data in a down sampling portion 104 to lower the resolution thereof. However, another method may be employed in which shape data are first obtained for high-resolution pixel data, and the shape data are then thinned out to obtain low-resolution shape data.

The shape data generated here are binary images or images having two or more levels of gradation. In the latter case, superimposition of a part image and a background image according to the above expression (1) can be considered as weighted mean of the part image and the background image with the shape data being a weight. Note that the shape data $s(i,j)$ in the expression (1) takes a value "1" within the target part image, "0" outside the part image, and a value between "0" and "1" at the boundary portion of the part image.

A first shape data coding portion 107 codes low-resolution shape data for a lower layer. If the shape data are binary data, run length coding, MMR coding, chain coding, or the like is used for the coding. If the shape data are expressed with two or more levels of gradation, a coding scheme using DCT as in MPEG, a coding scheme using a quaternary tree and vector quantization ("MPEG-4 Video Verification Model Version 2.0" (ISO/IECTC1/SC29/WG11 N1260)), or the like is used.

A second shape data generating portion 102 generates high-resolution shape data for an upper layer from high-resolution pixel data. The method of generating the shape data is same as in the first shape data generating portion 106, and therefore, description thereof is not repeated. A second shape data coding portion 103 codes the high-resolution shape data generated by second shape data generating portion 102. The method of coding the shape data is same as in the first shape data coding portion 107, and description thereof is not repeated. Note that those two shape data coding portions 103, 107 do not have to use the identical coding method; they may use separate methods for coding, instead.

An upper layer coding portion 101 codes high-resolution pixel data. The coding is performed using the international standard method of coding motion images, such as MPEG or H.261, as in the technique described in the Background Art section. Herein, however, the coding utilizes prediction from partially decoded images existing in lower layer coding portion 105 in addition to prediction from decoded images preceding or succeeding in time in the upper layer. For the boundary of part image, high-resolution shape data output from second shape data generating portion 102 are used.

Next, a decoding apparatus according to the first embodiment will be described with reference to FIG. 2.

A lower layer decoding apparatus 205 consists of portions surrounded by a broken line in FIG. 2. A first shape data decoding portion 204 decodes coded data of the lower layer shape data to obtain low-resolution shape data. The decoded shape data are sent to a lower layer decoding portion 203, and are also used for display of a lower layer image. Lower layer decoding portion 203 decodes coded data of the lower layer pixel data, and supplies low-resolution pixel data to a lower layer display portion (not shown).

Next, decoding of an upper layer in FIG. 2 will be described. A second shape data decoding portion 202 decodes coded data of the upper layer shape data to obtain high-resolution shape data. The decoded shape data are sent to an upper layer decoding portion 201, and also used for display of an upper layer image.

Upper layer decoding portion 201 decodes coded data of the upper layer pixel data, and supplies high-resolution pixel data to an upper layer display portion (not shown). Upper layer decoding portion 201 utilizes, as in the upper layer coding portion 101 shown in FIG. 1, prediction from the decoded images in lower layer decoding portion 203 in addition to prediction from the decoded images preceding or succeeding in time in the upper layer.

The second embodiment of the present invention will now be described.

In the first embodiment described above, high-resolution shape data used in an upper layer and low-resolution shape data used in a lower layer are coded independent of each other. Thus, information on the shape data in the lower layer is not reflected to coding of the shape data in the upper layer, and therefore, an amount of codes of the shape data in the upper layer becomes large. This leads to a problem that a total amount of codes for the upper layer increases than in the case where the methods shown in FIGS. 10 and 11 are employed. Accordingly, this embodiment aims to solve the above problem by coding only information on the difference between low-resolution shape data and high-resolution shape data.

Figure 3:
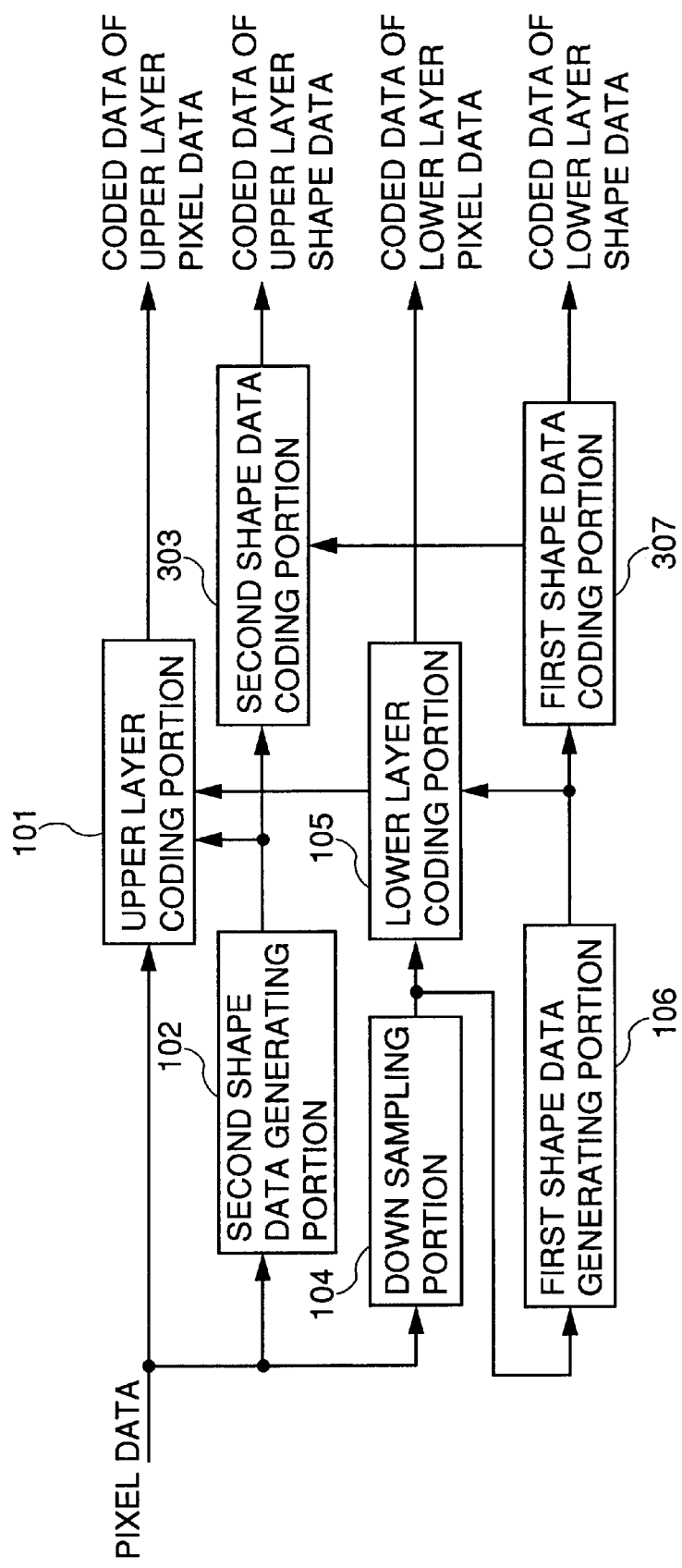
FIG. 3 is a block diagram showing a coding apparatus according to a second embodiment of the present invention.
Figure 4:
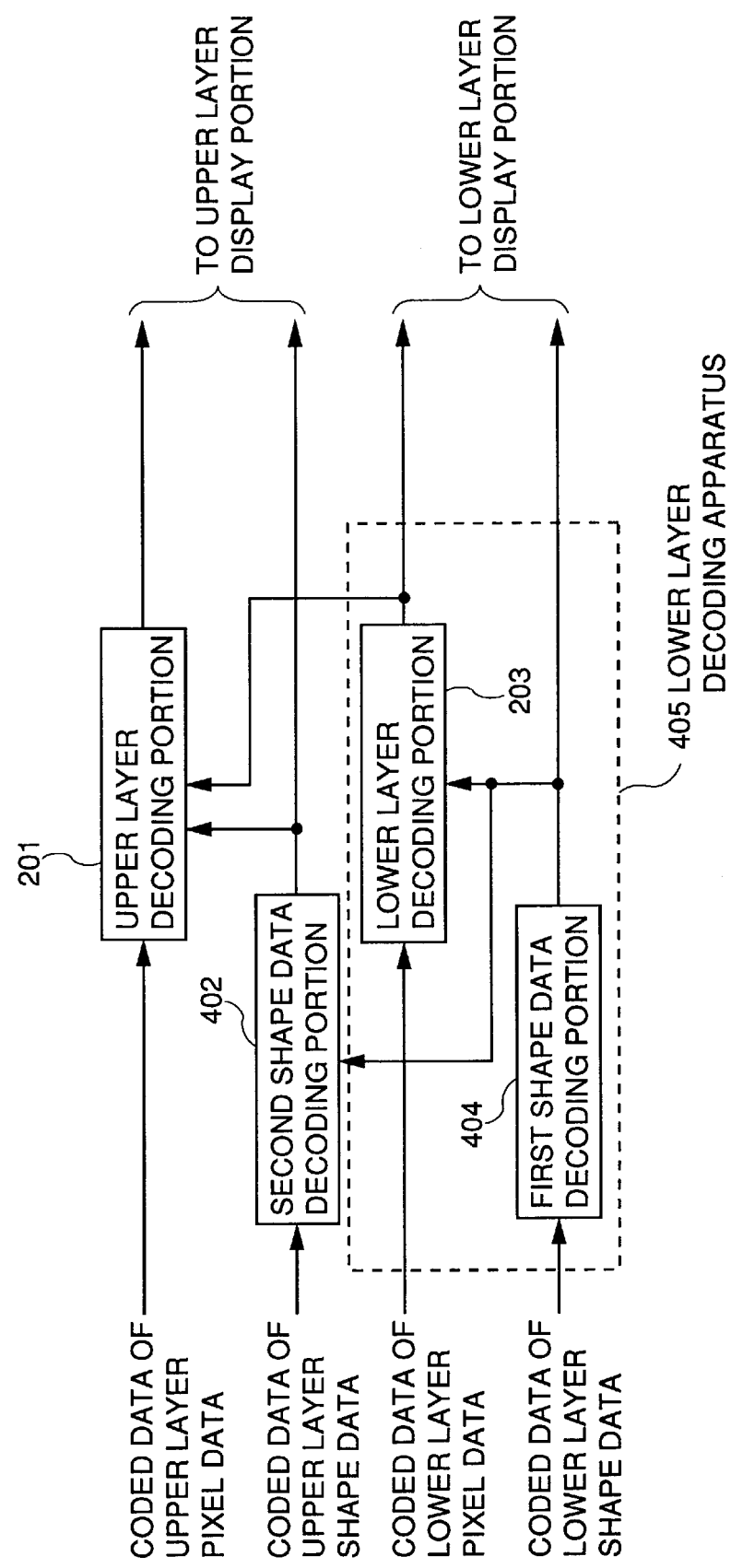
FIG. 4 is a block diagram showing a decoding apparatus according to the second embodiment of the present invention.

FIGS. 3 and 4 are block diagrams respectively showing a coding apparatus and a decoding apparatus according to the second embodiment.

The coding apparatus in FIG. 3 differs from the coding apparatus in FIG. 1 in that low-resolution shape data in a first shape data coding portion 307 are sent to a second shape data coding portion 303, and the second shape data coding portion 303 codes only information on the difference between the low-resolution shape data and the high-resolution shape data.

Other than that, upper layer coding portion 101, second shape data generating portion 102, down sampling portion 104, lower layer coding portion 105, and first shape data generating portion 106 are the same as those in FIG. 1, and therefore, description thereof is not repeated.

The decoding apparatus in FIG. 4 is different from the decoding apparatus in FIG. 2 in that low-resolution shape data decoded in a first shape data decoding portion 404 are sent to a second shape data decoding portion 402, and the second shape data decoding portion 402 decodes high-resolution shape data along with the information on the difference.

Other than that, upper layer decoding portion 201 and lower layer decoding portion 203 are same as those in FIG. 2, and therefore, description thereof is not repeated. In addition, a lower layer decoding apparatus 405 is equivalent to lower layer decoding apparatus 205 in FIG. 2.

Figure 7:
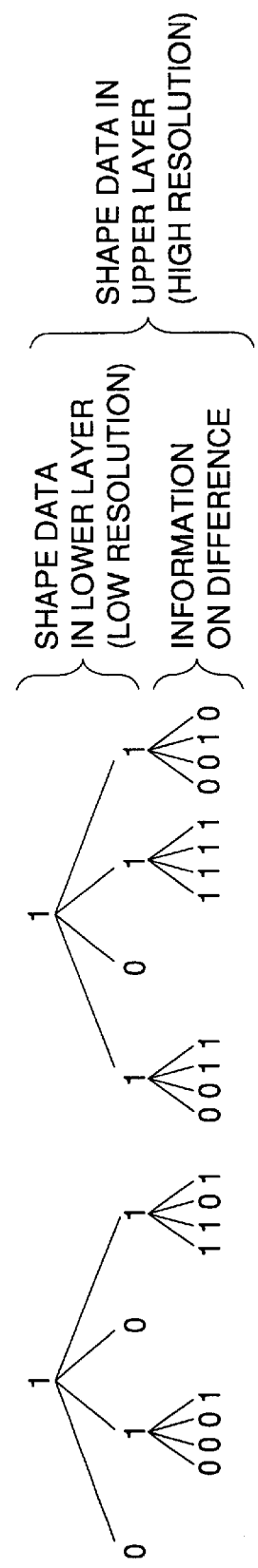
FIG. 7 is a diagram for use in illustrating information on difference between upper layer shape data and lower layer shape data.

When a quaternary tree is used for representing binary shape data, for example, data in the lower hierarchies of the tree may be used as the above-described information on the difference. FIG. 7 shows binary shape data and exemplary quaternary tree representation thereof. The uppermost value of the quaternary tree is "1" when at least one pixel value "1" exists within a block of 4 pixels by 4 pixels, or "0" otherwise. Values at the second and the third hierarchies of the tree are likewise determined for blocks of 2 pixels by 2 pixels and of 1 pixel by 1 pixel, respectively.

Blocks at respective hierarchies are scanned from above left to below right in a raster scan sequence. In the example shown in FIG. 7, the shape data in the upper layer are expressed with three hierarchies, and the shape data in the lower layer are expressed with two hierarchies. The data in the third hierarchy is expressed as the information on the difference between the upper and lower layers. These data expressed with the quaternary tree are coded by arithmetic coding, for example.

When the shape data are expressed with two or more layers of gradation, another coding method may be employed, in which low-resolution shape data are up-sampled to the resolution for an upper layer before taking the difference with high-resolution shape data, and the difference data are then coded by transformation coding.

Next, the third embodiment of the present invention will be described.

In the methods described with reference to FIGS. 10 and 11 as above, low-resolution shape data are obtained by thinning out shape data. This may cause a problem that the contour of a part image in the lower layer becomes stepwise, which results in degradation of the image quality.

In the third embodiment, the above problem is solved by setting up for shape data more layers of gradation than in the original shape data, along with thinning out of the shape data.

Figures 8A, 8B, 8C, 8D:
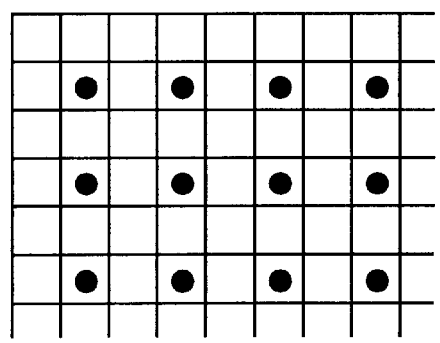
FIGS. 8A through 8D are diagrams for use in illustrating a technique for obtaining low-resolution shape data from high-resolution shape data according to the present invention.

FIG. 8A shows a part of binary shape data. FIG. 8B shows exemplary shape data transformed to be adapted to a low-resolution monitor of which the resolution is halved and the pixel size is doubled both vertically as well as horizontally. In this example, a 2×2 filter,

| | |
|---|---|
| 0.25 | 0.25 |
| 0.25 | 0.25, | is applied to a block surrounded by a bold line in FIG. 8A, thereby obtaining low-resolution shape data having five levels of gradation of 0, 0.25, 0.5, 0.75, and 1. When an element of the above 2×2 filter is represented as $f(i,j)$ and an element within a block in FIG. 8A is represented as $d(i,j)$, the filtering operation can be represented as follows:

$$\Sigma f(i,j)d(i,j)$$

wherein $\Sigma$ represents a sum for $i=1, 2$ and $j=1, 2$. If the original shape data has N levels of gradation, the filtering allows generation of shape data with $M(M>N)$ levels of gradation.

FIG. 8C shows exemplary shape data used for enlarging a part image of low resolution for display on a monitor that allows display with the same resolution as in FIG. 8A. The data can be obtained by simply enlarging the data in FIG. 8B by a factor of 2 vertically as well as horizontally. Increasing the number of levels of gradation of the shape data in low resolution as described above can avoid the stepwise appearance of the boundary portion.

The shape data generated in FIG. 8C, for example, can be used for superimposing images according to the expression (1) described in the Background Art section. In this case, the background and the foreground are mixed at the contour portion of a part image, thereby making the stepwise pattern at the boundary inconspicuous.

Though the above example has been described using a 2×2 filter, other filters may be employed, instead. For example, a 3×3 filter as follows can be used to transform shape data into a vertically as well as horizontally halved version.

| 0 | 1/6 | 0 |
|---|---|---|
| 1/6 | 2/6 | 1/6 |
| 0 | 1/6 | 0 |

Here, target pixels for sub-sampling are, for example, those shown by ● in FIG. 8(d).

Figure 5:
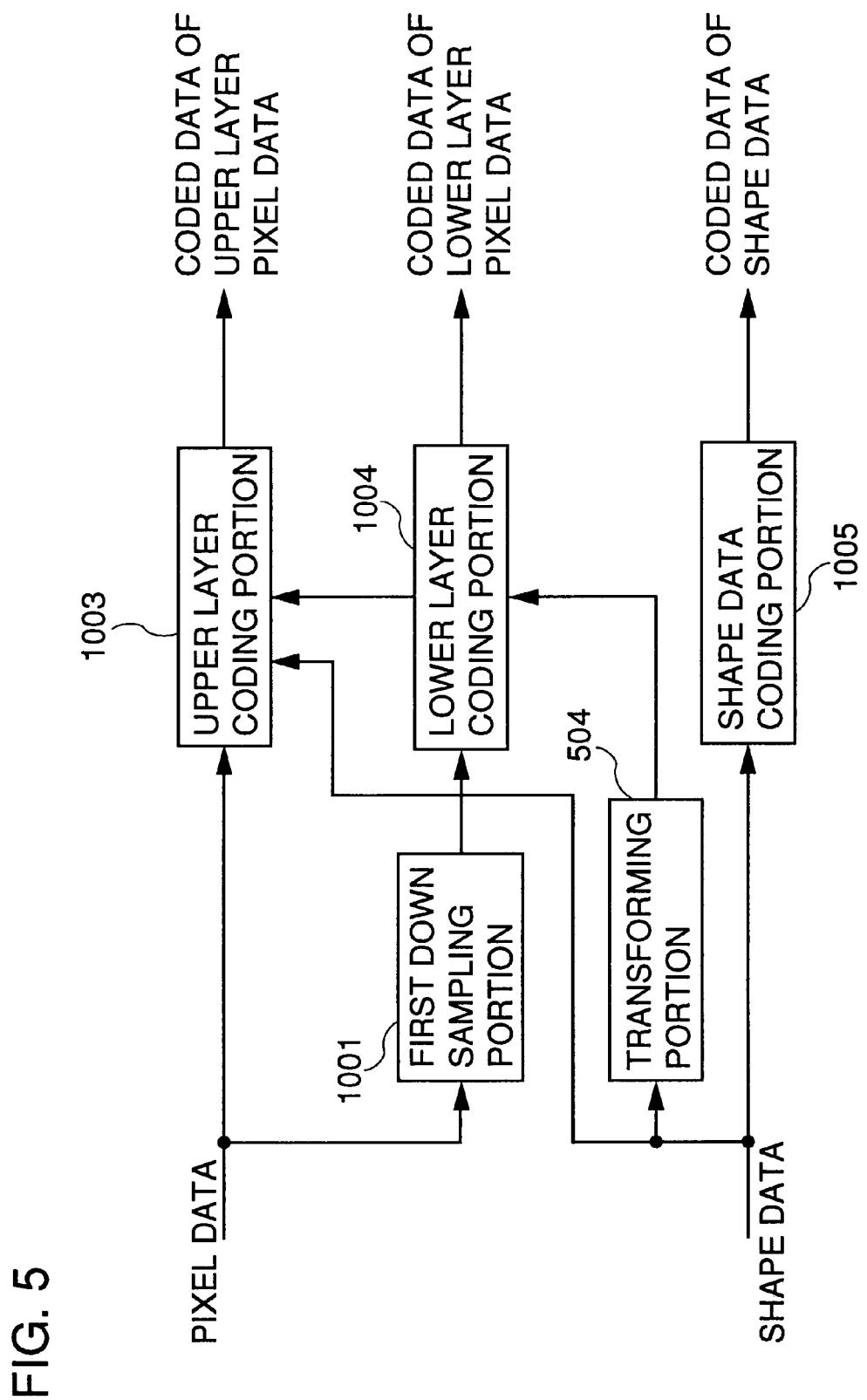
FIG. 5 is a block diagram showing a coding apparatus according to a third embodiment of the present invention.
Figure 6:
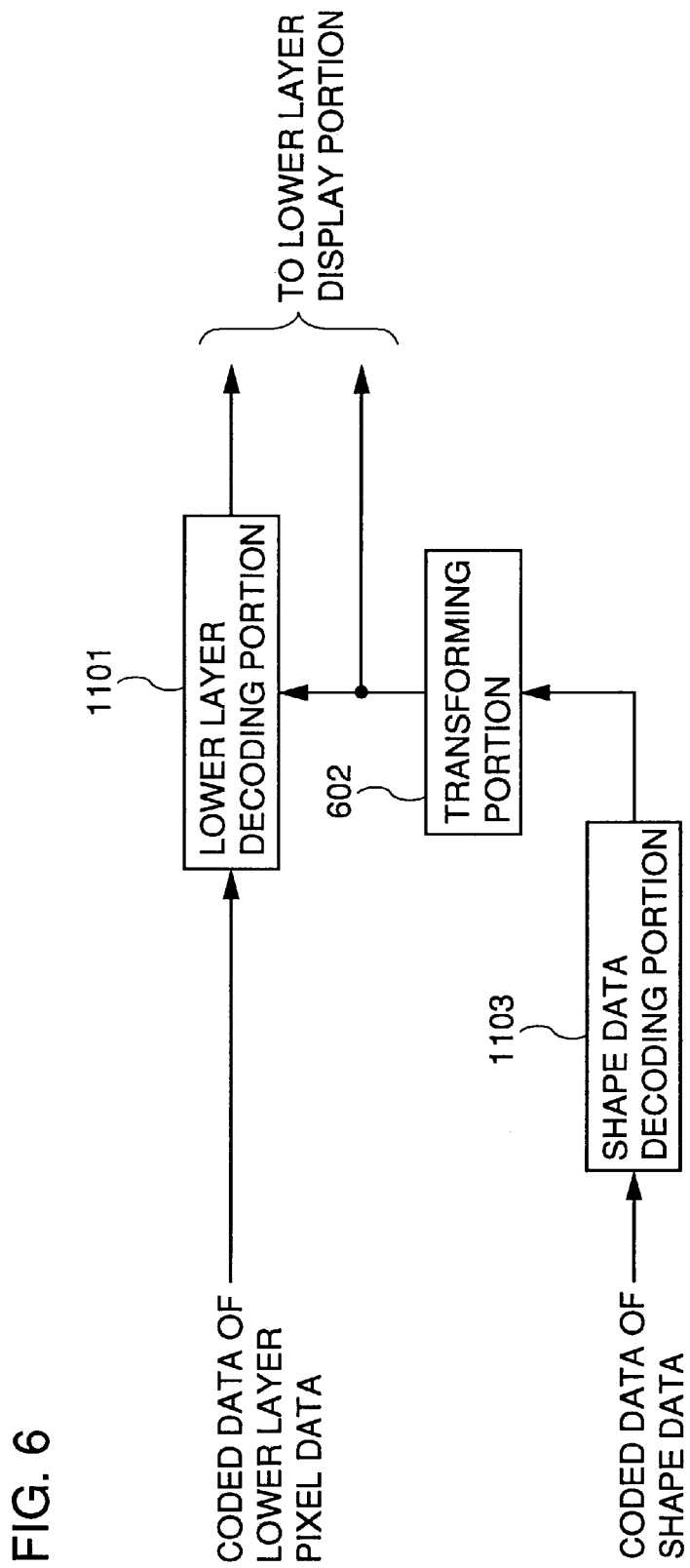
FIG. 6 is a block diagram showing a decoding apparatus for a lower layer according to the third embodiment of the present invention.

FIGS. 5 and 6 are block diagrams respectively showing a coding apparatus and a lower layer decoding apparatus according to the third embodiment. They are modifications of those that are shown in FIGS. 10 and 11, with the portions for down sampling the shape data being replaced by transforming portions 504 and 602, respectively.

Other than that, first down sampling portion 1001, upper layer coding portion 1003, lower layer coding portion 1004, shape data coding portion 1005, lower layer decoding portion 1101, and shape data decoding portion 1103 are same as those in FIGS. 10 and 11, and therefore, description thereof is not repeated.

Transforming portions 504 and 602, each operating identical to each other, transform shape data into the ones having lower resolution but more levels of gradation, as shown in FIG. 8.

Though a 2×2 filter has been used in FIGS. 8A–8C, many other filters, such as those of 3×3 or 2×5, can also be used for transformation.

Furthermore, in the description of the coding apparatus according to the above embodiments, shape data sent to the shape data coding portion have also been sent to the corresponding pixel data coding portion. In that case, however, a problem will arise when nonreversible coding is performed in the shape data coding portion, because the shape data used in a pixel data coding portion and the shape data used in a pixel data decoding portion in a decoding apparatus become different from each other.

Figure 9:
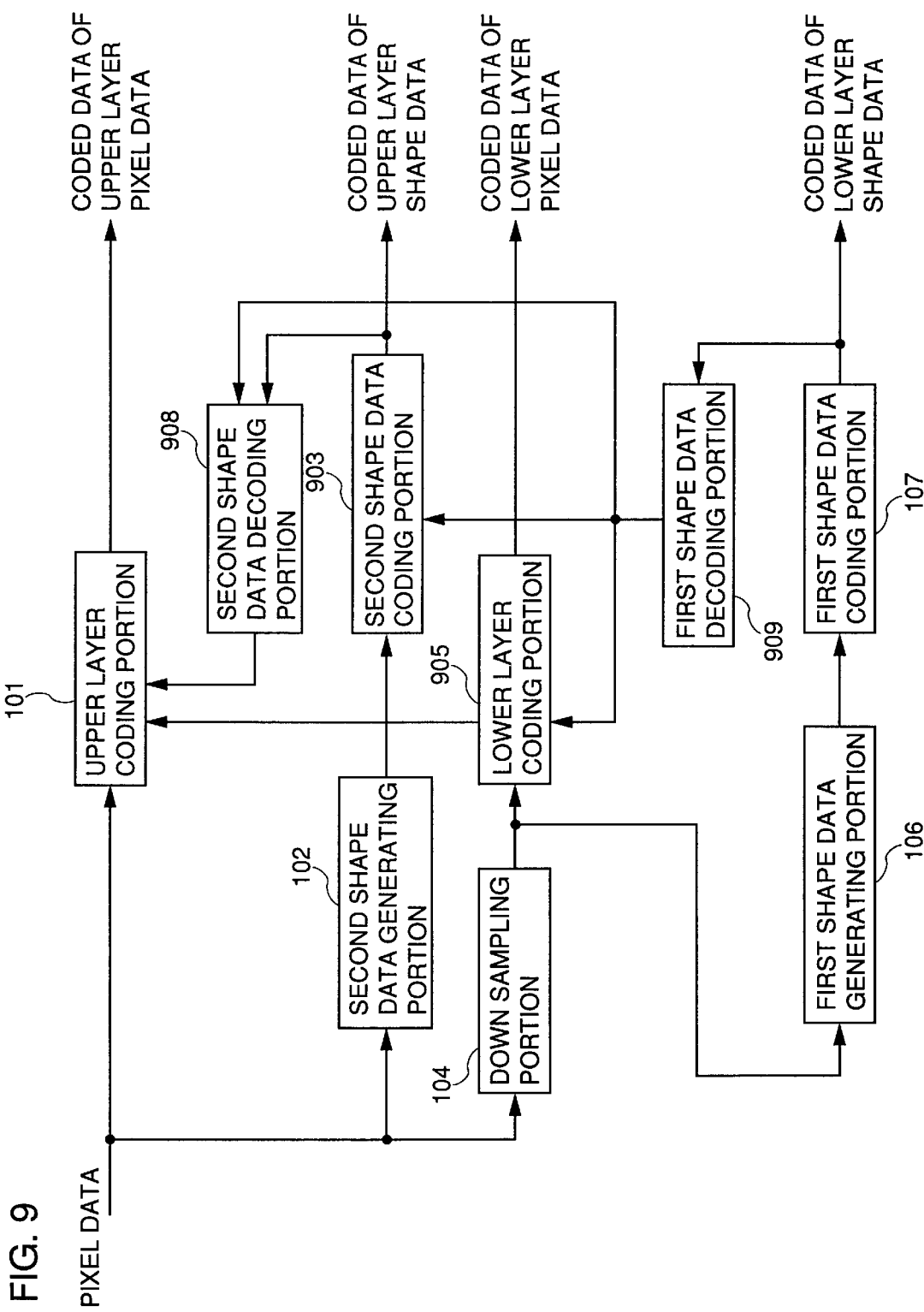
FIG. 9 is a block diagram showing a coding apparatus according to another embodiment of the present invention.

In such a case, the coding apparatus may be provided with a shape data decoding portion, so that the coded shape data can be decoded in the shape data decoding portion before being sent to the corresponding pixel data coding portion. FIG. 9 shows a variation of the coding apparatus in FIG. 3, which has been modified in this manner.

Referring to FIG. 9, decoded data of the lower layer shape data that have been decoded by a first shape data decoding portion 909 are sent to a lower layer coding portion 905 as well as to a second shape data coding portion 903 and a second shape data decoding portion 908. A decoding apparatus corresponding to the coding apparatus shown in FIG. 9 also uses the decoded data of lower layer shape data at an upper layer shape data decoding portion, that is a portion equivalent to the second shape data decoding portion 908 in FIG. 9.

Finally, the fourth embodiment of the present invention will be described.

The present embodiment is based on the first and second embodiments, but in which an upper layer is configured to improve spatial resolution of only a portion of part image coded in the lower layer. By this configuration, an area for a face of a figure can be coded as a part image in the lower layer, and only the mouth portion can be coded in high resolution in the upper layer, for example.

When the fourth embodiment is adapted to the first embodiment, the second shape data generating portion 102 of the coding apparatus shown in FIG. 1 can be used to generate high-resolution shape data corresponding to a portion of part image, and thus the present invention can be implemented.

As a decoding apparatus corresponding thereto, the apparatus shown in FIG. 2 can be used as it is. Likewise, when this embodiment is adapted to the second embodiment, the high-resolution shape data corresponding to a portion of part image can be generated by the second shape data generating portion 102 of the coding apparatus shown in FIG. 3, whereby the present invention can be implemented.

In this case, however, a signal line from the first shape data coding portion 307 to the second shape data coding portion 303 is not used. Therefore, there is a need to provide a switch to switch between the methods described in the fourth and second embodiments. This switch is provided between the first shape data coding portion 307 and the second shape data coding portion 303. When using the method according to the fourth embodiment, the switch is turned off and the upper layer shape data (the second shape data) are coded independently. When using the method as described in the second embodiment, the switch is turned on and the information on the difference between the upper layer shape data (the second shape data) and the lower layer shape data (the first shape data) are coded.

For a decoding apparatus, the apparatus shown in FIG. 4 is provided with a similar switch, which is disposed on a signal line connecting the first shape data decoding portion 404 and the second shape data decoding portion 402 in FIG. 4. The switch, as with the switch in the coding apparatus, controls switching between the case in which the upper layer shape data (the second shape data) are decoded independently, and the case in which the data representing the difference between the upper layer shape data (the second shape data) and the lower layer shape data (the first shape data) are decoded and then the difference data are added to the lower layer shape data (the first shape data) to decode the upper layer shape data (the second shape data).

According to the motion image coding apparatus and the motion image decoding apparatus according to the above embodiments, the following favorable effects can be obtained:

(1) Coding and decoding of a part image having spatial hierarchy can be realized.

(2) In the first embodiment, low-resolution shape data are coded as the shape data for a lower layer. Accordingly, redundancy associated with coding of high-resolution shape data in the lower layer can be eliminated. Therefore, an image in the lower layer can be coded and decoded in desirable image quality, even with limited transmission or storage capacity.

(3) In the second embodiment, information on the shape data in the lower layer is used for coding the shape data in the upper layer, and information on the difference between the low-resolution shape data and the high-resolution shape data is coded. Accordingly, data amount necessary for coding the shape data in the upper layer can be reduced. Therefore, efficient coding can be realized in the upper layer.

(4) In the third embodiment, upper layer shape data are transformed to generate lower layer shape data having more levels of gradation. Accordingly, the stepwise boundary existing in the contour portion of lower layer shape data can be made inconspicuous. Therefore, the contour of a part image on display becomes smooth, and thus a psychically favorable image can be obtained.

(5) In another embodiment of the present invention, assuming that the upper layer shape data are smaller than the lower layer shape data, hierarchical coding for improving spatial resolution of a part of the lower layer using data in the upper layer can be performed. Accordingly, if there is a need to look into the contents of an image only in a portion of the lower layer, or if only a portion in the lower layer has a complex texture and has to be displayed in high resolution, it is possible to perform an appropriate hierarchical coding.

Industrial Applicability

As described above, the present invention enables efficient coding and decoding of a part image having spatial hierarchy. Accordingly, the present invention is advantageously applicable to the field of image coding and decoding apparatuses.

What is claimed is:

1. An image coding apparatus, comprising:

a first shape data generating portion generating first shape data representing a first arbitrary shape in low resolution;

a first shape data coding portion coding said generated first shape data;

a lower layer coding portion using said first shape data to code a part image in a lower layer in low resolution;

a second shape data generating portion generating second shape data representing a second arbitrary shape in high resolution;

a second shape data coding portion coding said generated second shape data; and an upper layer coding portion using said second shape data and decoded part image data in the lower layer to code a part image in an upper layer in high resolution;

said second shape data generating portion being switched to generate, as said second shape data, either high-resolution shape data corresponding to an entire region of said first arbitrary shape or high-resolution shape data corresponding to only a partial region within said first arbitrary shape.

2. The image coding apparatus according to claim 1, wherein said second data coding portion codes information on difference between said first shape data and said second shape data when the second shape data generated by said second shape data generating portion is the high-resolution shape data corresponding to an entire region of said first arbitrary shape, and said second shape data coding portion codes said second shape data independently of said first shape data when the second shape data generated by said second shape data generating portion is the high-resolution shape data corresponding to a partial region of said first arbitrary shape.

3. An image decoding apparatus, comprising:

a first shape data decoding portion decoding first shape data of a first arbitrary shape coded in low resolution;

a lower layer decoding portion using said decoded first shape data to decode a part image in a lower layer in low resolution;

a second shape data decoding portion decoding second shape data of a second arbitrary shape coded in high resolution; and an upper layer decoding portion using said decoded second shape data and decoded part image data in the lower layer to decode a part image in an upper layer in high resolution;

said second shape data decoding portion being switched, depending on a type of the second shape data, to decode either high-resolution shape data corresponding to an entire region of said first arbitrary shape or high-resolution shape data corresponding to a partial region of said first arbitrary shape.

4. The image decoding apparatus according to claim 3, wherein said second shape data decoding portion decodes the second shape data based on information on difference between said first shape data and said second shape data when said second shape data is the high-resolution shape data corresponding to an entire region of said first arbitrary shape, and said second shape data decoding portion decodes the second shape data independently of said first shape data when said second shape data is the high-resolution shape data corresponding to a partial region of said first arbitrary shape.

* * * * *